(12) United States Patent
Al-Khalil et al.

(10) Patent No.: US 6,196,500 B1
(45) Date of Patent: Mar. 6, 2001

(54) HYBRID ICE PROTECTION SYSTEM FOR USE ON ROUGHNESS-SENSITIVE AIRFOILS

(75) Inventors: Kamel M. Al-Khalil, Rutherford, NJ (US); Thomas F. W. Ferguson, New York, NY (US)

(73) Assignee: Cox & Company, Inc., New York, NY (US)

( * ) Notice: Subject to any disclaimer, the term of this patent is extended or adjusted under 35 U.S.C. 154(b) by 0 days.

(21) Appl. No.: 09/330,444

(22) Filed: Jun. 11, 1999

Related U.S. Application Data

(62) Division of application No. 08/665,914, filed on Jun. 19, 1996, now Pat. No. 5,921,502.

(51) Int. Cl.$^7$ ................................................ B64D 15/00
(52) U.S. Cl. ........................... 244/134 R; 244/134 D; 244/134 B
(58) Field of Search ....................... 244/134 R, 134 A, 244/134 B, 134 C, 134 D, 134 E, 134 F

(56) References Cited

U.S. PATENT DOCUMENTS

| | | | |
|---|---|---|---|
| H648 | * | 7/1989 | Tran . |
| 4,674,714 | * | 6/1987 | Cole et al. . |
| 5,558,304 | * | 9/1996 | Adams . |
| 5,782,435 | * | 7/1998 | Ingram et al. . |
| 5,845,878 | * | 12/1998 | Rauckhorst et al. . |
| 5,921,502 | * | 7/1999 | Al-Khalil et al. . |

* cited by examiner

*Primary Examiner*—Peter M. Poon
*Assistant Examiner*—Tien Dinh

(57) ABSTRACT

An electro-thermal or hot gas anti-icer of the "running-wet" type is mounted at the leading edge of an airfoil. Mechanical de-icers are mounted on the surfaces aft of the anti-icer. The mechanical de-icers throw off ice without creating runback water, thereby eliminating runback refreeze ridges caused by a known hybrid ice-protection system. Advantageously, the de-icers are of a type in which the airfoil has a semi-rigid skin that forms an aerodynamic surface of the airfoil, and in which there is at least one mechanical actuator for flexing the skin.

1 Claim, 3 Drawing Sheets

HYBRID ICE PROTECTION SYSTEM FOR USE ON ROUGHNESS-SENSITIVE AIRFOILS

CROSS REFERENCE TO RELATED APPLICATIONS

This application is a divisional application of commonly-owned allowed U.S. patent application Ser. No. 08/665,914 filed Jun. 19, 1996 now U.S. Pat. No. 5,921,502.

BACKGROUND OF THE INVENTION

The invention relates to aeronautics, and more specifically relates to systems that remove ice from aircraft surfaces. In its most immediate sense, the invention relates to ice-protection systems for use on airfoils that are roughness-sensitive. As used herein, "roughness" refers to "sandpaper" ice, distributed ice contamination or spanwise steps or ridges of ice downstream of the leading edge.

To be commercially successful, a new airplane must be fast, fuel-efficient, and capable of operation in icing conditions. For these reasons, airframe makers have devoted intensive attention to developing advanced designs for lifting and control surfaces. This effort has produced high performance aircraft that may perform or handle poorly under certain icing conditions, and particularly under icing conditions that produce "sandpaper ice".

When a lifting or control surface encounters supercooled water in an "inadvertent encounter" of one or two minutes duration, the ice accretes in a characteristic pattern. The accreted ice has a low height and a rough texture; the texture is sufficiently rough to adversely affect the airflow over the ice. Such ice is known as "sandpaper ice". Ice roughness can be left on surfaces when a de-icing system fails to remove all the accumulated ice, thereby leaving a residue of ice that may be unacceptable.

Sandpaper ice accretion on lifting surfaces (e.g. wings and tails) and particularly at and near the leading edge of a wing, roughens the surface of the wing and changes the airflow pattern over and around it. If the lifting surface is sensitive to roughness, this change in airflow pattern substantially degrades the maximum lift and the angle at which maximum lift occurs.

So, too, roughness upstream of control surfaces (e.g. ailerons and elevators) can interfere with the desired operational characteristics of those surfaces. This is because such ice accretion disturbs the airflow and creates a separation bubble. When the thus-disturbed turbulent airflow reaches the control surfaces downstream, it can dramatically alter the hinge moments of such surfaces, even to the extent of reversing such moments.

Accordingly, to perform properly in icing conditions, the leading edges of roughness-sensitive surfaces must be kept almost entirely free of ice at all times, and ice ridge steps downstream of the leading edge must be minimized.

Evaporative anti-icing systems have been used to keep surfaces free of ice. An evaporative anti-icing system works by transferring sufficient heat to impinging water to cause the water to evaporate. Because of this evaporation, there is no ice or liquid water to flow beyond the boundary of the heated region of the airfoil and to thereby accrete as ice on the unheated region.

In an evaporative anti-icing system of the "bleed air" or the "hot gas" type, bleed air drawn from the engine compressor, or hot gas drawn from some other source, is used as a heat source. Such systems are unsatisfactory when bleed air or hot gas is unavailable in sufficient quantities and/or when it is impractical to deliver bleed air or hot gas to the surface to be protected. In such instances, evaporative electro-thermal systems are logical alternatives.

For an evaporative electro-thermal system to keep the leading edge of an airfoil entirely ice-free, the system requires substantial electrical power. Such a power requirement could be satisfied, if at all, only at great expense. For this reason, an evaporative electro-thermal anti-icing system would be impractical on aircraft with roughness-sensitive surfaces.

If ice is allowed to build up, the accreted ice can be removed using a mechanical de-icing system. In such systems, accreted ice is periodically removed by mechanically deforming (as by a rubber boot or an electrically operated mechanical actuator) the surface upon which the ice accretes. Such systems can only work once the ice layer has accreted beyond some critical thickness. If the layer of ice has not reached its critical thickness, it will merely deform together with the surface upon which it has accreted and will not be removed. This is particularly true when a "brief encounter" causes sandpaper ice to form on an initially clean surface. Sandpaper ice is difficult to remove using any means other than heat. For this reason, a mechanical de-icer system would likewise be impractical on aircraft with roughness-sensitive surfaces.

A hybrid anti-icing and de-icing system is also known. In this system, an electro-thermal "running wet" anti-icer is located at the leading edge and covers the stagnation region for the full envelope of the aircraft. An electro-thermal de-icer is located aft of the anti-icer. The running wet anti-icer (usually called a "parting strip" to indicate its function of preventing an ice cap from accreting on the leading edge) heats impinging water only to such an extent that freezing is prevented. Thus, the water neither fully evaporates from, nor freezes on, the parting strip. The heated and as yet unfrozen water runs back aft of the parting strip onto the de-iced surface, where the heated water eventually loses its heat and freezes. The frozen water is then periodically removed by the electro-thermal de-icer. (The electro-thermal de-icer may have a plurality of de-icer segments downstream of the parting strip, each one removing ice that has formed aft of the one before it.)

This system, too, is unsuitable for aircraft with roughness-sensitive surfaces. When the electro-thermal de-icer sheds the ice accreted aft of the leading edge, there is necessarily some water runback to surfaces aft of the de-icer, which surfaces are not de-iced. Such water runback freezes aft of the de-icer, and forms ridges of ice. If an airplane is e.g. in a holding pattern during icing conditions, ice ridges can continue to grow taller until they substantially degrade the lifting and control performance of the wings and control surfaces.

Therefore, known ice-protection systems are not always adequate for use on aircraft surfaces that are roughness-sensitive. Likewise, known ice-protection systems are not adequate for use immediately upstream of control surfaces that function improperly in the presence of separated airflow.

One object of the invention is to provide an ice-protection system that would adequately anti-ice surfaces that are roughness-sensitive, or that are sensitive to residual ice (e.g. ice ridges) left by operation of existing ice protection systems.

Another object is to provide such an ice-protection system that would perform its function without unreasonably large requirements for electrical power or bleed air.

Still a further object is to provide such an ice-protection system that would be economical and easily adaptable to different applications.

Yet another object is, in general, to improve on ice-protection systems of this general type.

These objects, and others that will be apparent hereinafter, are achieved in accordance with the invention. The invention proceeds from the realization that there is a particular combination of individually known ice-protection systems that performs unexpectedly well. This combination is a hybrid system using a running-wet anti-icer at the leading edge region, and using a mechanical de-icing apparatus aft of the anti-icer. Advantageously, the anti-icer is electro-thermal or of the hot gas type and is located within the roughness-sensitive zone of the airfoil or surface, and the mechanical de-icing apparatus is advantageously of a new type wherein an aerodynamic surface of the airfoil is formed by a semi-rigid skin and the skin is flexed by at least one mechanical actuator.

Using a running-wet anti-icer at the leading edge region is more thermally efficient than using an evaporative anti-icer, thereby reducing the power needed to run the system. Furthermore, using mechanical de-icing aft of the anti-icer does not cause ice ridges to build up aft of the de-iced surface, because there is no water runback. As a result, use of mechanical de-icing apparatus aft of a running-wet anti-icer achieves a substantially anti-iced result without undue expenditure of money and energy.

Especially advantageous results are obtained when the mechanical de-icers are of the new type in which part of the aerodynamic surface is a semi-rigid skin that is flexed by at least one mechanical actuator. This type of de-icer can shed accreted ice layers as thin as 0.050 inch. By cycling the mechanical de-icers at short intervals during the icing encounter, the ice ridges downstream of the leading edge can be reduced to an acceptable height and the surfaces aft of the leading edge can thereby be maintained in a satisfactorily ice-free condition. As a result, the surface is, in effect, anti-iced without the power consumption ordinarily associated with anti-icing.

BRIEF DESCRIPTION OF THE DRAWINGS

The invention will be better understood with reference to the following illustrative and non-limiting drawings, in which.

DETAILED DESCRIPTION OF PREFERRED EMBODIMENTS

In the description below, the same element is always indicated by the same reference number, and correspondences between elements are indicated by primed reference numbers. The drawings are not to scale; various elements may be shown in exaggerated or minimized size for clarity of illustration.

The description below relates to preferred embodiments as installed on a lifting surface (here, the wing or the horizontal tail of an airplane). However, it will be understood that the invention can be installed to protect any airfoil leading edge surface (e.g. an engine inlet).

Figure 1A:
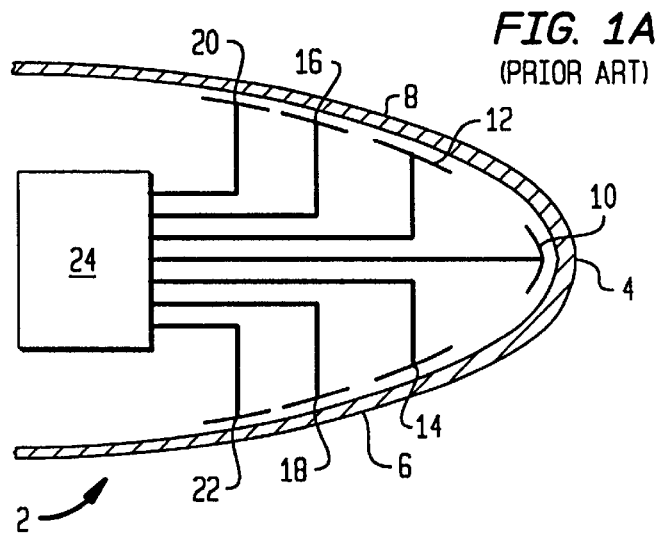
FIGS. 1A, 1B and 1C schematically illustrate an operating cycle of a known hybrid ice-protection system.
Figure 1B:
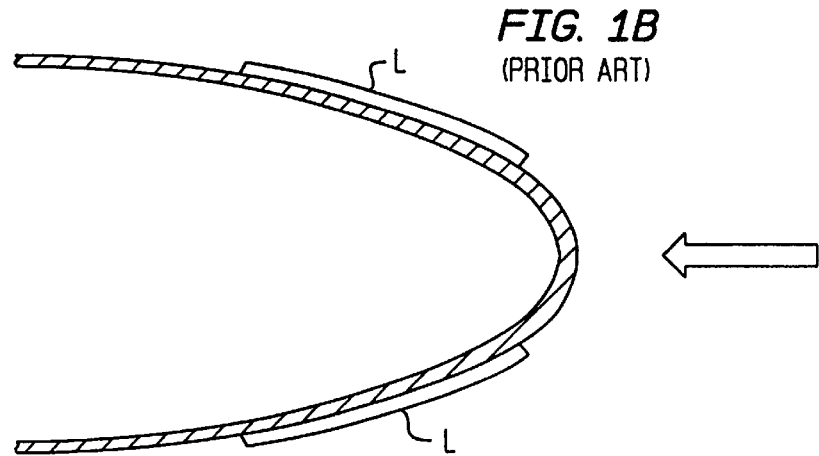
Figure 1C:
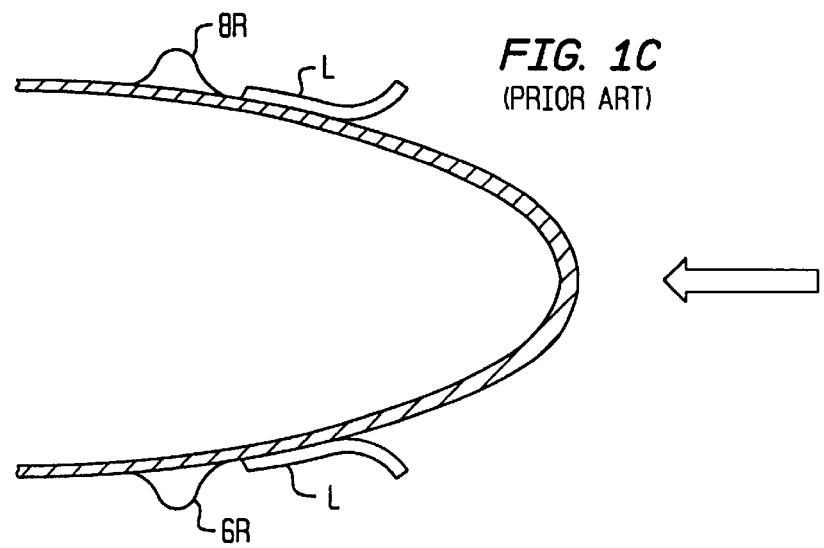

In a known hybrid ice-protection system shown in FIGS. 1A–1C an airfoil generally indicated by reference number 2 has a leading edge region 4. A high-pressure surface 6 and a low-pressure surface 8 are located immediately aft of the leading edge region. An electro-thermal anti-icer 10 of the running wet type is used to heat the leading edge region, and an electro-thermal de-icer system formed from electro-thermal heating strips 12, 14, 16, 18, 20, and 22 is used to de-ice the surfaces 6 and 8. A controller 24 is used to supply power to the anti-icer 10 and the strips 12–22.

FIG. 1B schematically illustrates what happens in icing conditions before the de-icer is operated. In use, the controller 24 regulates the temperature of the anti-icer 10 to maintain impinging supercooled water droplets above freezing. The water droplets run back onto the surfaces 6 and 8, where the droplets freeze to form a layer L of ice. (See FIG. 1B.) Then, the strips 12–22 are energized in sequence to melt the bottom of the layer L of ice, thereby debonding the layer L from the surfaces 6 and 8 of the airfoil. First, the strip 12 is energized. The strip 14 is energized next, and then the strips 16, 18, 20, and 22 in the order listed. This order of energization melts the bottom of the layer L of ice from forward to aft, so that the ice can be peeled aft by the airstream and thereby thrown off the airfoil 2.

When the strips 20 and 22 are energized, ice melted during this energization turns to water and runs back aft of the strips 20 and 22. This runback water refreezes and forms ridges 6R and 8R on the surfaces 6 and 8. As a result, residual ice remains on the airfoil 2 even after ice covering the strips 20 and 22 has been thrown off (FIG. 1C). If the airfoil 2 is a roughness-sensitive wing on an airplane flying for extended periods during icing conditions, the ridges 6R and 8R can grow in size and dangerously diminish maximum lift and angle-of-attack margin-to-stall. The ridge 8R, being on the low-pressure surface 8, may be of particular concern.

Figure 2:
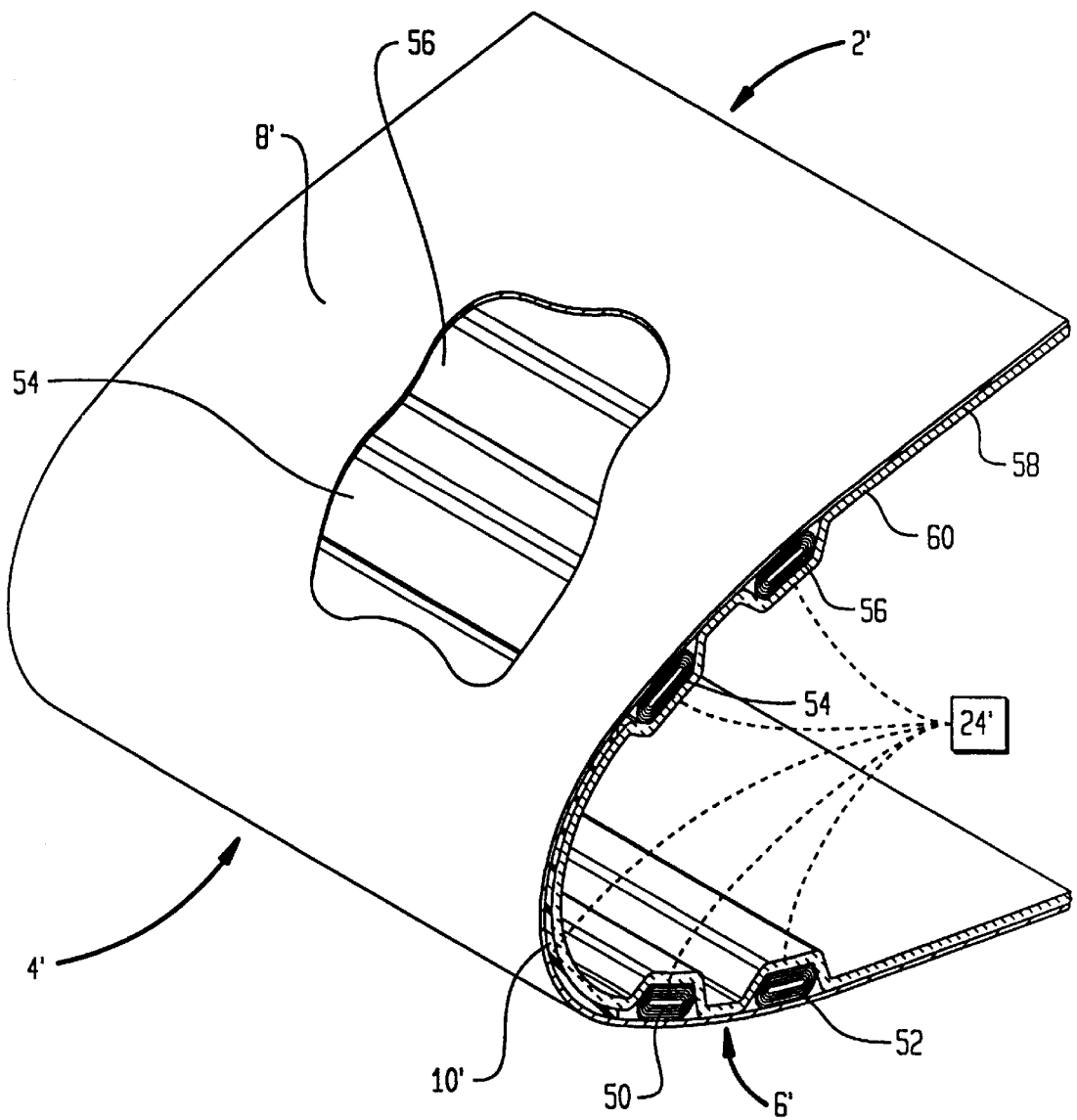
FIG. 2 schematically illustrates a preferred embodiment of the invention.

In accordance with the preferred embodiment of the invention as illustrated in FIG. 2, the airfoil 2' has a leading edge region 4' and high-pressure and low-pressure surfaces 6' and 8' respectively. An electro-thermal running-wet anti-icer 10' anti-ices the leading edge region 4'. A set of de-icer actuators 50 and 52 periodically de-ice the surface 6', and another set of de-icer actuators 54 and 56 periodically de-ice the surface 8'. The anti-icer 10' is temperature-controlled by a control unit 24' using a temperature sensor (not shown). The control unit 24' also controls the energization of the actuators 50–56.

The actuators 50, 52, 54 and 56 are all of the same type, and are disclosed and claimed in U.S. Pat. No. 5,782,435. (The disclosure of this patent is hereby incorporated in this patent application by reference.) In this type of de-icer structure, the airfoil 2' has a semi-rigid skin 58 that is supported by a substructure 60. The actuators 50–56 are electrical coils that change shape when short bursts of current are directed through them. When energized using such short bursts of current, the actuators 50–56 flex the skin 58 and crack off accreted ice that is thicker than a certain limit. Experiments have determined that this type of de-icer can remove ice accretions as thin as 0.050 inch.

Although the preferred embodiment of the invention utilizes the actuators 50–56 and the semi-rigid skin, this is only preferred. Other mechanical de-icer systems (e.g. a pneumatic system, an electro-mechanical system, an electro-magnetic system, an impulse system) can be used instead.

The anti-icer 10' is advantageously located entirely within the roughness-sensitive zone of the airfoil 2'. Generally, the anti-icer 10' is located entirely within the zone where supercooled water droplets strike the airfoil (the "impingement zone"). In this way, the anti-icer 10' is kept fully wetted in icing conditions and heat transfer to the water is maximized. Advantageously, the temperature of the anti-icer 10' is maintained near just above freezing. This insures that impinging water droplets do not freeze at the leading edge region 4' and that there is no runback aft of the de-icer actuators 50–56.

In practice, the number and the location of the de-icer actuators (e.g. 50–56) is chosen to meet the particular requirements of the application. For example, if a wing encounters supercooled large droplets as opposed to droplet sizes specified in FAR Part 25, Appendix C, ice can accrete to 12% chord or more on the leading edge. The FIG. 2 embodiment has four de-icer actuators 50, 52, 54, and 56 to cope with this. The two front actuators 50 and 54 remove ice accretion from supercooled small droplets, and the two rear actuators 52 and 56 remove ice accretion from supercooled large droplets.

Figure 3:
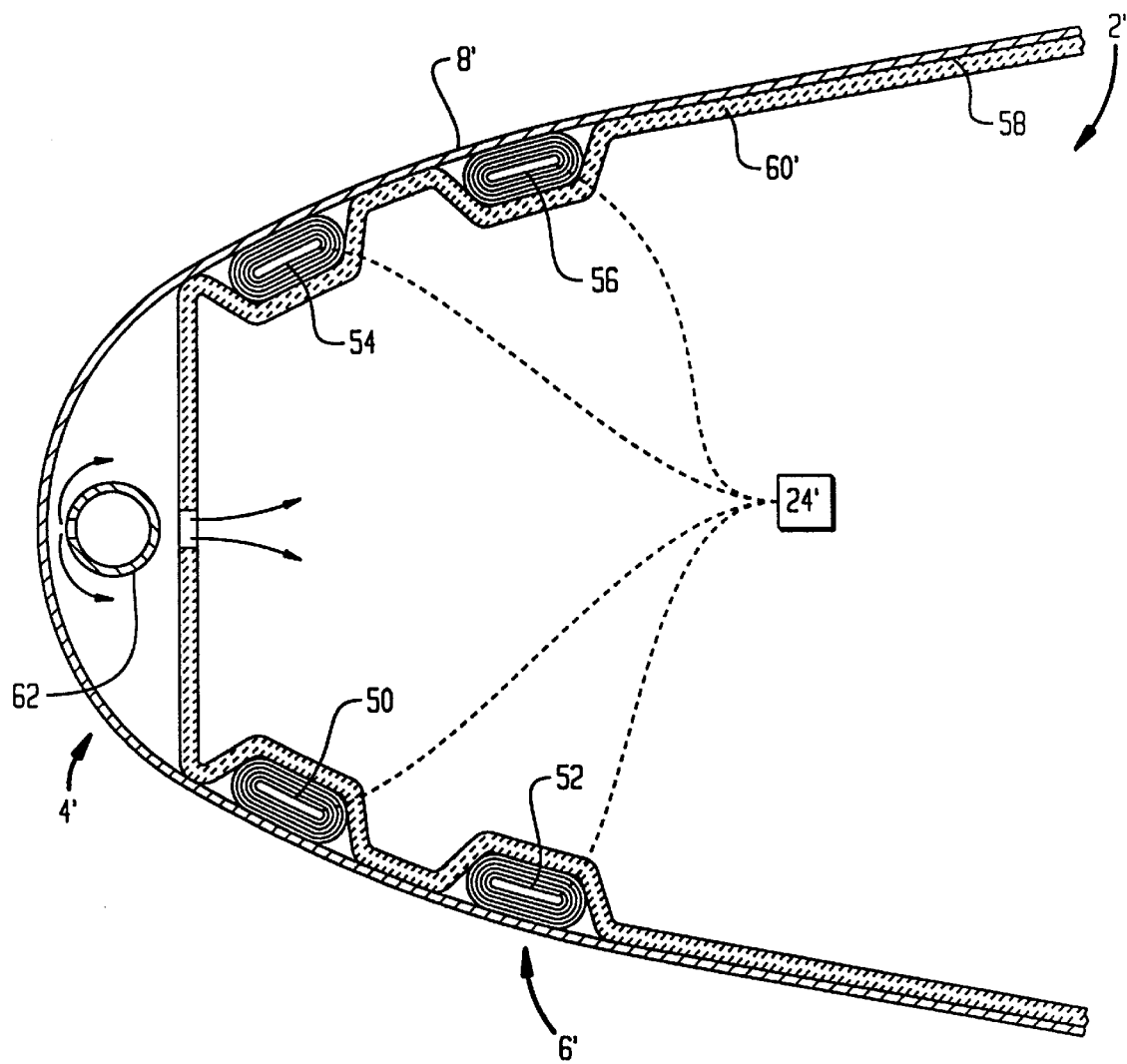
FIG. 3 shows another preferred embodiment of the invention.

The running-wet anti-icer need not be of the electrothermal type. As is shown in FIG. 3, it is alternatively possible for the running-wet anti-icer to be a bleed air system or a hot gas system. The heated air (bleed air or air heated in the heat exchanger) is then routed to a piccolo tube 62 (typically) and used to heat the leading edge, the flow rate of the air being controlled using a regulator valve (not shown). To prevent the air from heating the actuators 50–56, the air is vented to outboard downstream.

An icing tunnel test was conducted using a model similar to FIG. 2, but having only front actuators 50 and 54. Outside the area of the running-wet anti-icer 10', the maximum observed thickness of the accreted ice was less than 0.050", with an average thickness of 0.025". The measured maximum thickness was independent of the duration of exposure to icing conditions, and there was no frozen runback water in unprotected regions. The test showed:

a) Roughness aft of the anti-icer 10' could be maintained below 0.050".

b) There was no formation of ice ridges, because runback water froze exclusively in the de-iced zone.

c) Exposure to icing conditions could be continued indefinitely without overwhelming the system. As a result, an airplane equipped with the preferred embodiment can be kept for extended periods in icing conditions.

Although a preferred embodiment has been described above, the scope of the invention is limited only by the following claims:

What is claimed is:

1. A dynamic mechanical deicer adapted for attachment to a substructure, the deicer having an outer surface that meets and breaks an impinging airstream when attached to the substructure, the substructure having an apex corresponding to the portion of the deicer and substructure underlying the area of the outer surface where the radius of curvature is smallest, comprising:

a deflectable skin;

skin deflection means disposed beneath a first area of said deflectable skin for deflecting said deflectable skin away from the substructure; and a skin heating means disposed beneath said deflectable skin at the apex of the substructure, wherein said skin heating means heats said skin.

* * * * *